United States Patent [19]

Saito et al.

[11] 4,036,785

[45] July 19, 1977

[54] CATALYST FOR REDUCTION OF NITROGEN OXIDES IN PRESENCE OF AMMONIA

[75] Inventors: Masumi Saito, Kobe; Sumio Tani, Neyagawa; Shigeaki Matsui, Higashiosaka; Shigeaki Kasaoka, Okayama, all of Japan

[73] Assignee: Kurashiki Boseki Kabushiki Kaisha, Japan

[21] Appl. No.: 711,184

[22] Filed: Aug. 3, 1976

[30] Foreign Application Priority Data

Aug. 4, 1975 Japan .................................. 50-95231

[51] Int. Cl.² ........................ B01J 21/06; B01J 23/74
[52] U.S. Cl. .................................. 252/472; 252/461; 423/82; 423/83
[58] Field of Search ................. 252/461, 472; 423/82, 423/83, 213.2, 213.5, 239

[56] References Cited

U.S. PATENT DOCUMENTS 1,219,277  3/1917  Farup .................................. 252/472

FOREIGN PATENT DOCUMENTS 536,999  2/1957  Canada .................................. 423/83
304,230  7/1971  U.S.S.R. .................................. 423/239

OTHER PUBLICATIONS

Hayashi et al., "Reaction of $NH_3$ and NO by Using Various Metal Oxide Catalysts," Preprint of Japan Chem. Soc. (Catalyst Div.), pp. 134-135, 1973.

*Primary Examiner*—W. J. Shine
*Attorney, Agent, or Firm*—Jones, Tullar & Cooper

[57] ABSTRACT

A catalyst for reduction of nitrogen oxides in the presence of ammonia, which can be advantageously prepared by treating titanium slag with sulfuric acid at an elevated temperature, optionally followed by treatment with an alkali, and decomposing the resulting product while heating at a temperature of about 400° to 700° C and has a high catalytic activity with a long catalytic life and a high resistance to acid substances.

16 Claims, No Drawings

CATALYST FOR REDUCTION OF NITROGEN OXIDES IN PRESENCE OF AMMONIA

The present invention relates to a catalyst for reduction of nitrogen oxides ($NO_x$) in the presence of ammonia, and its production and use. More particularly, it relates to a catalyst for reduction of nitrogen oxides, particularly nitric oxide (NO), in the presence of ammonia, a process for producing the catalyst economically from ilmenite ore or titanium slag and a method for removal of nitrogen oxides from exhaust gases by the use of the catalyst.

As catalytically active compounds for reduction of nitrogen oxides present in exhaust gases such as combustion gases from boilers in the presence of ammonia, there are known various metallic compounds such as sulfide, sulfates and oxides of copper, iron, manganese, nickel, cobalt, molybdenum, chromium and silver. For the use as the catalyst, these metallic compounds are usually deposited on alumina or alumina-silica as a carrier. However, those catalysts deposited on alumina or alumina-silica are not resistant to acid substances, and their catalytic activity is much deteriorated within a short period of time when used for removal of nitrogen oxides from exhaust gases including sulfurous acid gas ($SO_2$). This is probably due to the adsorption of $SO_3$ produced from the reaction of $SO_2$ with $O_2$ onto the surface of the catalyst or the formation of $Al_2(SO_4)_3$ by the reaction of the said $SO_3$ with alumina at the surface of the catalyst.

When the said metallic compounds are deposited on titanium oxide ($TiO_2$), there are obtained catalysts which have a high catalytic activity and are highly resistant to acid substances. Thus, they are suitable for removal of nitrogen oxides from exhaust gases including sulfurous acid gas.

As the source of the titanium oxide, there is usually employed purified titanium oxide obtained from ilmenite ore. Such purified titanium oxide is substantially free from iron and other metallic compounds originally included in ilmenite ore, and the deposition of any catalytically active metallic component thereon is necessary for the use as the catalyst.

For depositing catalytically active metallic components onto titanium oxide, there are proposed various procedures, of which typical ones are a method which comprises adding an alkali to an aqueous solution of a water-soluble titanium compound (e.g. titanium oxide, titanium oxysulfate, titanium chloride) and any water-soluble compound of a catalytically active metallic component so as to co-precipitate titanium and the metallic component in the form of their hydroxides, a method which comprises admixing titanium oxide with any compound of a catalytically active metallic component to make their uniform mixture, etc. These operations are, however, usually complicated and not sufficiently convenient.

While, as stated above, titanium oxide is normally obtained from ilmenite ore, such ore originally includes iron (usually about 40% by weight in terms of iron oxides) and other various metallic components such as silicon, aluminum, magnesium, calcium, manganese, chromium and vanadium. Since most of these metallic components are per se effective in the catalytic reduction of nitrogen oxides in the presence of ammonia, the use of them for this purpose without their removal from titanium oxide may be greatly advantageous. However, powdered ilmenite itself does not have any appreciable catalytic activity in the said catalytic reduction.

As the result of the extensive study, it has now been found that titanium slag obtained by refining of ilmenite ore according to a conventional procedure exhibits a remarkable catalytic activity in the reduction of nitrogen oxides in the presence of ammonia with a long catalytic life, when treated with sulfuric acid. It may be noted that the titanium slat itself prior to the treatment with sulfuric acid does not exert any practical catalytic activity in the said reduction. The present invention is based on the above finding.

A basic object of the present invention is to provide a catalyst for catalytic reduction of nitrogen oxides in the presence of ammonia. Another object of this invention is to provide a process for preparing a catalyst for catalytic reduction of nitrogen oxides in the presence of ammonia. A further object of the invention is to provide a method for catalytic reduction of nitrogen oxides in the presence of ammonia. A still further object of the invention is to provide a method for removal of nitrogen oxides from exhaust gases using a catalyst in the presence of ammonia. These and other objects of the invention will be apparent to those skilled in the art from the foregoing and subsequent descriptions.

The catalyst of the invention comprises as the essential component the one prepared by treating titanium slag with sulfuric acid at an elevated temperature, optionally followed by treatment with an alkali, and decomposing the resulting product while heating.

The titanium slag usable for production of the catalyst of the invention is obtainable by refining of ilmenite ore according to a conventional procedure and may include from about 65 to 95% by weight of titanium (in terms of $TiO_2$) and from about 2 to 8% by weight of iron (in terms of FeO). In addition to these essential components, it may include other metallic components such as Si, Al, Mg, Ca, Mn, Cr, V, etc. originally present in ilmenite ores. When the iron content is lower than the said lower limit, the resulting catalyst does not show any appreciable catalytic activity. When the iron content is higher than the said upper limit, the catalytic activity of the resulting catalyst is somewhat higher at the initial stage but its catalytic life is so short as being not suitable for the practical use.

Treatment of the titanium slag with sulfuric acid may be carried out, for instance, by heating a mixture of the titanium slag with about 50 to 90% (w/w) (preferably about 60 to 70% (w/w)) sulfuric acid in a molar ratio of the sulfuric acid in terms of $H_2SO_4$ and the titanium slag in terms of $TiO_2$ being not less than about 1.2:1 (preferably from about 1.5:1 to 2.0:1 to 2:0) at a temperature of not lower than about 100° C (preferably from about 120° to 160° C). The time for treatment is associated with the temperature for treatment, the concentration and amount of sulfuric acid, etc. and may be usually for several hours.

The resulting sulfuric acid-treated titanium slag may be subjected as such to heat decomposition by calcining at a temperature of about 500° to 700° C (preferably of about 550° to 650° C). Favorably, however, the sulfuric acid-treated titanium slag is treated with an alkali such as aqueous ammonia to convert the metallic components into their hydroxides, and the resulting hydroxides are collected and calcined at a temperature of about 400° to 700° C (preferably of about 500° to 600° C) to give the corresponding oxides. Shaping of the catalyst into any desirable form such as pellets may be effected at any stage prior to or after calcination.

The thus obtained catalyst of the invention comprises titanium and iron in the form of their oxides and, in addition, small amounts of other various metallic oxides originally present in ilmenite ore.

Reduction of nitrogen oxides, particularly nitric oxide, in the presence of ammonia by the use of the above obtained catalyst may be carried out in a per se conventional procedure. The catalyst is especially utilizable for removable of nitrogen oxides from exhaust gases containing them.

For instance, an exhaust gas comprising nitrogen oxides such as combustion gas from a boiler may be passed together with a gaseous ammonia through an apparatus having a catalyst bed which is packed with the said catalyst and maintained, for instance, at a temperature of about 350° to 450° C for reducing the nitrogen oxides in the exhaust gas. Preferably, the exhaust gas is pre-heated prior to the introduction into the catalyst bed for assisting the heat control of the catalyst bed. The amount of the gaseous ammonia to be introduced may be usually from about 0.65 to 4 times, preferably from about 1 to 3 times, the stoichiometric amount thereof.

The reduction of nitric oxides is considered to proceed according to the following reaction formulae:

$$6NO + 4NH_3 \rightarrow 5N_2 + 6H_2O$$

$$3NO_2 + 4NH_3 \rightarrow 7/2N_2 + 6H_2O$$

Practical and presently preferred embodiments of the present invention are illustratively shown in the following Examples wherein % and ppm are by volume, unless otherwise indicated.

EXAMPLE 1

A mixture of powdery titanium slag (manufactured by Hokuetsu Metal Co., Ltd.; containing 93% by weight of $TiO_2$ and 2.4% by weight of FeO) (8 g) and 65% (w/w) sulfuric acid (407 g) was heated at 140° C for 20 hours while stirring. After cooling, the resultant mixture was filtered. The filtrate separated from the precipitate was admixed with ammonia water, and the precipitated material was collected by filtration. The collected cake was pelletized, dried at 110° C for 1 day and calcined at 500° C for 3 hours to give a catalyst (0.64 g) in pellets having a size of about 2 to 3 mm.

The catalyst (0.64 g) as prepared above was packed in a glass column, and the column was kept at 400° C. A gaseous mixture comprising 200 ppm of NO, 1200 ppm of $SO_2$, 5% of $O_2$, 10% of $CO_2$, 10% of $H_2O$ and $N_2$ for balance was admixed with gaseous ammonia as a reducing agent to make a concentration of 400 ppm and then passed through the said column at a flow velocity of 500 Nml/min, whereby 35% of NO was reduced.

EXAMPLE 2

The precipitate obtained in Example 1 was neutralized with ammonia and filtered. The collected material was washed with water, dried at 110° C for 20 hours and crushed. The crushed powder was kneaded with water and pelletized. The pellets were dried at 110° C for 1 day and calcined at 500° C for 3 hours to give a catalyst (5.8 g) in pellets having a size of 6 mm.

The catalyst (2 g) as prepared above was packed in a glass column, and the column was kept at 400° C. A gaseous mixture comprising 200 ppm of NO, 1200 ppm of $SO_2$, 5% of $O_2$, 10% of $CO_2$, 10% of $H_2O$ and $N_2$ for balace was admixed with gaseous ammonia as a reducing agent to make a concentration of 400 ppm and then passed through the said column at a flow velocity of 500 Nml/min, whereby 85% of NO was reduced.

EXAMPLE 3

The catalyst (2 g) as prepared in Example 2 was packed into a glass column, and the column was kept at 400° C. A gaseous mixture comprising 2% of $SO_2$, 20% of $O_2$, 10% of $H_2O$ and $N_2$ for balance was passed through the said column at a flow velocity of 500 Nml/min for 1 week.

Then, a gaseous mixture comprising 200 ppm of NO, 1200 ppm of $SO_2$, 5% of $O_2$, 10% of $CO_2$, 10% of $H_2O$ and $N_2$ for balance was admixed with gaseous ammonia as a reducing agent to make a concentration of 400 ppm and then passed through the said column kept at 300°, 350°, 400° or 450° C at a flow velocity of 500 Nml/min, whereby 47, 73, 85 or 93% of NO was reduced, respectively.

By comparison of the above result at 400° C with the result in Example 2, it can be understood that the catalyst of this invention is quite resistant to acidic substances and its catalytic activity is not substantially deteriorated even after the treatment with acidic substances for a long period of time.

EXAMPLE 4

Into a 200 ml volume flask, powdery titanium slag (16 g) as used in Example 1 and 65% (w/w) $H_2SO_4$ (45 g) were charged, and the resultant mixture was heated at 150° C for about 3 hours while stirring. The resulting mixture was admixed with water (500 ml), and aqueous ammonia was added thereto. The precipitate was collected by filtration, dried, calcined at 500° C for 3 hours and then compressed to make a catalyst in pellets having a volume of 1 ml/10 pellets.

Separately, powdery ilmenite (containing 34.8% by weight of iron oxide (in terms of FeO) and 60.7% by weight of titanium oxide (in terms of $TiO_2$) (16 g) and 65% (w/w) $H_2SO_4$ (120 g) were charged into a flask, and the resulting mixture was heated at 125° C for 8 hours while stirring. The resulting mixture was treated in the same manner as above to make a catalyst in pellets having a volume of 1 ml/10 pellets.

As in Example 3, tests on the catalytic activity and the resistance to acidic substances were carried out at 400° C using the catalyst (1 g). The results are shown in Table 1, from which it is understood that, in comparison with the catalyst prepared by the use of ilmenite, the catalyst prepared by the use of titanium slag (which has a lower iron content than ilmenite does) shows somewhat a lower catalytic activity at the initial stage but maintains its sufficient catalytic activity for a long period of time. It is particularly notable that the catalyst using titanium slag is much more resistant to acidic substances than that using ilmenite.

|  | Temperature for treatment (° C) | Percentage of NO reduction (%) | | |
|---|---|---|---|---|
|  |  | Initial stage | Long run test at 400° C | Resistance to acid substances at 400° C |
| Catalyst prepared by using titanium slag | 300 | 35 |  |  |
|  | 350 | 56 |  |  |
|  | 400 | 67 | 67*1) | 67*2) |
|  | 450 | 76 |  |  |
| Catalyst prepared by | 300 | 54 |  |  |
|  | 350 | 71 |  |  |

-continued

| | Temperature for treatment (° C) | Percentage of NO reduction (%) | | |
|---|---|---|---|---|
| | | Initial stage | Long run test at 400° C | Resistance to acid substances at 400° C |
| using ilmenite | 400 | 78 | 68*3) | 34*2) |
| | 450 | 79 | | |

Note:
*1)after 750 hrs.
*2)after 100 hrs.
*3)after 150 hrs.

REFERENCE EXAMPLE 1

Alumina of 5 mm in size (30 g) was immersed in an aqueous solution containing $CuSO_4$ in a concentration of 0.94 mol/kg (45 g) at room temperature for 24 hours. After taking out from the solution, the alumina was washed with water, dried at 110° C for 24 hours and calcined in air at 540° C for 3 hours to give a catalyst.

The catalytic activity of the catalyst (2 g) as prepared above for reduction of NO was tested as in Example 1. As the result, 97% of NO was reduced.

Using the catalyst after the above test, a gaseous mixture comprising 1.6% of $SO_2$, 10% of $H_2O$, 20% of $O_2$ and $N_2$ for balance was treated with a flow velocity of 500 Nml/min at 400° C for 96 hours. As the result, the catalytic activity was decreased to show only 10% NO reduction.

REFERENCE EXAMPLE 2

To an aqueous solution of titanium oxysulfate ($TiOSO_4$) and ferric sulfate ($Fe_2(SO_4)_3$), aqueous ammonia was added. The precipitate was collected by filtration, dried at 110° C for 24 hours and calcined at 550° C for 3 hours to give a catalyst of $Fe_2O_3$-$TiO_2$ (particle size, 16 - 20 mesh) having a weight ratio of FeO and $TiO_2$ as shown in Table 2.

Using the catalyst (250 mg) as prepared above, the life of the catalytic activity was tested as in Example 1 at 400° C. The results are shown in Table 2, from which it is understood that Catalyst Nos. 1 and 2 (corresponding to the case using titanium slag) are somewhat inferior to Catalyst No. 4 (corresponding to the case using ilmenite) in the catalytic activity at the initial stage but show a considerably longer catalytic life than the latter.

Table 2

| Catalyst No. | Catalyst composition FeO : $TiO_2$ by weight | Percentage of NO reduction (%) | |
|---|---|---|---|
| | | Initial | After 1000 hrs |
| 1 | 3.2 : 96.8 | 91 | 91 |
| 2 | 8.6 : 91.4 | 91.5 | 91.5 |
| 3 | 16.7 : 83.3 | 92.5 | 87 |
| 4 | 37.5 : 62.5 | 95.5 | 78 |

What is claimed is:

1. A process for preparing a catalyst for reduction of nitrogen oxides in the presence of ammonia which comprises treating titanium slag having an iron content of about 2 to 8% by weight in terms of FeO on the basis of the weight of the titanium slag with sulfuric acid at a temperature not lower than about 100° C., drying and calcining the resultant product.

2. The process according to claim 1 wherein the titanium slag has a titanium content of about 65 to 95% by weight in terms of $TiO_2$.

3. The process according to claim 1 wherein the molar ratio of sulfuric acid in terms of $H_2SO_4$ and the titanium slag in terms of $TiO_2$ is not less than 1.2:1.

4. The process according to claim 1 wherein the treatment with sulfuric acid is carried out at a temperature of about 120° to 160° C.

5. The process according to claim 1 wherein the calcining is carried out at a temperature of about 400° to 700° C.

6. The process according to claim 1 where the resultant product is treated with an alkali before calcining.

7. The process according to claim 6 wherein the titanium slag has a titanium content of about 65 to 95% by weight in terms of $TiO_2$.

8. The process according to claim 6 wherein the molar ratio of sulfuric acid in terms of $H_2SO_4$ and the titanium slag in terms of $TiO_2$ is not less than 1.2:1.

9. The process according to claim 6 wherein the treatment with sulfuric acid is carried out at a temperature of about 120° to 160° C.

10. The process according to claim 6 wherein the calcining is carried out at a temperature of about 400° to 700° C.

11. A process for preparing a catalyst for reduction of nitrogen oxides in the presence of ammonia which comprises treating titanium slag, having a titanium content of about 65 to 95% by weight in terms of $TiO_2$ and an iron content of about 2 to 8% by weight in terms of FeO on the basis of the weight of the titanium slag, with sulfuric acid, the mole ratio of sulfuric acid in terms of $H_2SO_4$ and the titanium slag in terms of $TiO_2$ being not less than 1.2:1, at a temperature not lower than about 100° C., filtering the resultant mixture, treating the resultant filtrate with alkali to form a precipitate, drying and calcining the precipitate.

12. A process for preparing a catalyst for reduction of nitrogen oxides in the presence of ammonia which comprises treating titanium slag, having a titanium content of about 65 to 95% by weight in terms of $TiO_2$ and an iron content of about 2 to 8% by weight in terms of FeO on the basis of the weight of the titanium slag, with sulfuric acid, the mole ratio of sulfuric acid in terms of $H_2SO_4$ and the titanium slag in terms of $TiO_2$ being not less than 1.2:1, at a temperature not lower than about 100° C., filtering the resultant mixture, neutralizing the resultant precipitate with alkali, drying and calcining the resultant product.

13. A process for preparing a catalyst for reduction of nitrogen oxides in the presence of ammonia which comprises treating titanium slag, having a titanium content of about 65 to 95% by weight in terms of $TiO_2$ and an iron content of about 2 to 8% by weight in terms of FeO on the basis of the weight of the titanium slag, with sulfuric acid, the mole ratio of sulfuric acid in terms of $H_2SO_4$ and the titanium slag in terms of $TiO_2$ being not less than 1.2:1, at a temperature not lower than about 100° C., treating the resultant mixture with alkali to form a precipitate, collecting, drying and calcining the precipitate.

14. A process for preparing a catalyst for reduction of nitrogen oxides in the presence of ammonia, which comprises heating a mixture of titanium slag with about 50 to 90% (w/w) sulfuric acid in a molar ratio of the sulfuric acid in terms of $H_2SO_4$ and the titanium slag in terms of $TiO_2$ being not less than 1.2:1, at a temperature of about 120° to 160° C., drying and decomposing the resulting product while heating at a temperature of about 400° to 700° C., the titanium slag having a titanium content of about 65 to 95% by weight in terms of $TiO_2$ and an iron content of about 2 to 8% by weight in terms of FeO on the basis of the weight of the titanium slag.

15. The process according to claim 14 wherein said resultant product is neutralized with an alkali before decomposition.

16. A catalyst prepared by the process as claimed in claim 1.